US011683873B1

United States Patent
Wang et al.

(10) Patent No.: US 11,683,873 B1
(45) Date of Patent: Jun. 20, 2023

(54) ENERGY-SAVING STREET LIGHT SYSTEM WITH DYNAMIC AND REAL-TIME BRIGHTNESS ADJUSTMENT

(71) Applicants: GENERAL LUMINAIRE (SHANGHAI) CO., LTD., Shanghai (CN); GENERAL LUMINAIRE (KUNSHAN) CO., LTD., Kunshan (CN); GENERAL LUMINAIRE CO., LTD., New Taipei (TW)

(72) Inventors: Yung-Hong Wang, Shanghai (CN); Chien Lee, Shanghai (CN)

( * ) Notice: Subject to any disclaimer, the term of this patent is extended or adjusted under 35 U.S.C. 154(b) by 0 days.

(21) Appl. No.: 17/585,589

(22) Filed: Jan. 27, 2022

(51) Int. Cl.
*H05B 47/115* (2020.01)
*H05B 47/19* (2020.01)
*F21S 8/08* (2006.01)
*F21W 131/103* (2006.01)

(52) U.S. Cl.
CPC ............ *H05B 47/115* (2020.01); *F21S 8/085* (2013.01); *H05B 47/19* (2020.01); *F21W 2131/103* (2013.01)

(58) Field of Classification Search
CPC ................. H05B 47/19; H05B 47/115; F21W 2131/103; F21S 8/085
See application file for complete search history.

(56) References Cited

U.S. PATENT DOCUMENTS

| | | | | |
|---|---|---|---|---|
| 2010/0320917 A1* | 12/2010 | Tsou | ...................... | H05B 47/14 315/159 |
| 2015/0035437 A1* | 2/2015 | Panopoulos | ............ | B60L 53/12 315/291 |
| 2017/0273165 A1* | 9/2017 | Sung | ...................... | G06Q 50/26 |
| 2017/0303372 A1* | 10/2017 | Isaak | ...................... | G06Q 50/06 |
| 2019/0215934 A1* | 7/2019 | Chen | ........................ | F21V 13/04 |

FOREIGN PATENT DOCUMENTS

| | | | |
|---|---|---|---|
| CN | 102143213 A | * | 8/2011 |
| TW | 201135123 A | * | 10/2011 |
| TW | 201303201 A | * | 1/2013 |

* cited by examiner

*Primary Examiner* — Raymond R Chai

(57) ABSTRACT

An energy-saving street light system with dynamic real-time brightness adjustment includes a multiple of street lights, each storing a modulated brightness value of the same luminous quota and a predetermined brightness value. If the street light detects no motor vehicle passing by or receives no notice for a period of time, then a light with the predetermined brightness value will be emitted, or else the largest modulated brightness value will be used for setting and a quantity of one of the luminous quota will be used up. After the whole quantity of the luminous quota is used up, the next smaller modulated brightness value is used for the aforementioned setting procedure until all modulated brightness values are set. If the same receiving unit receives two or more modulated brightness values simultaneously, the modulated brightness value with a greater brightness will be used for the setting.

6 Claims, 3 Drawing Sheets

ENERGY-SAVING STREET LIGHT SYSTEM WITH DYNAMIC AND REAL-TIME BRIGHTNESS ADJUSTMENT

BACKGROUND

Technical Field

The present disclosure relates to the field of lighting adjustment, and more particularly to an energy-saving street light system that dynamically adjusts the brightness of street lights in real time according to a motor vehicle traveling status and allows drivers to obtain sufficient lighting while effectively saving the consumption of energy.

Description of Related Art

Street light is a luminous lighting system installed on roads and streets as well as an important light source that drivers rely on when driving at night. A street light system not just provides illumination only, but also acts as an important device for ensuring the road traffic safety. In the past, due to the safety concern, the street light system was always turned on during the operating time, regardless of whether there were people, vehicles passing by, or its use on some roads in a remote area with low utilization rates, which thus causes a significant waste of electricity and an increase of the cost of electricity. Obviously, the cost of electricity of the street light system is not only a huge expenditure, but more importantly, the aforementioned arrangement will bring about a large consumption of energy. Due to the energy crisis that has spread all over the world quickly, and in the case of energy supply shortage and price increase, the economy of each country is suffering a substantial impact and even causing an economic shock. Therefore, how to effectively reduce the waste of energy is a goal that requires global efforts. In the present usage mode of the street light system, how to prevent unnecessary waste of electricity effectively under the premise of ensuring traffic safety demands immediate attentions and feasible solutions. Avoiding unnecessary consumption and waste of energy can have a significant positive impact on environmental protection and energy utilization.

In view of the problems above, the inventor of the present disclosure based on years of experience in the related industry to propose an energy-saving street light system with dynamic real-time brightness adjustment that can save the energy consumption of the street light system effectively without affecting the drivers' sight.

SUMMARY

Therefore, it is a primary objective of the present disclosure to use a "one-by-one" method" notification method to automatically, instantly and dynamically change the luminous brightness of the corresponding street lights according to the moving status of motor vehicles, thereby not just maintaining the excellent safety lighting function, but also effectively reducing the energy consumption of the street lights in a road section without motor vehicles, and applying short-distance communications to long-distance street light control to reduce the complexity of street light control and setup cost.

To achieve the aforementioned and other objectives, the present disclosure provides an energy-saving street light system with dynamic real-time brightness adjustment, and the energy-saving street light system includes a plurality of street lights arranged with an interval apart from one another and is characterized in that each of the street lights has a control processor, and the control processor includes a dimming unit, a detection unit, a sending unit, a receiving unit and a memory unit, wherein the memory unit stores N modulated brightness values and a predetermined brightness value, wherein N is an integer greater than zero, and the predetermined brightness value is smaller than the modulated brightness values; the modulated brightness values of different intensities have a correspondingly same amount of a luminous quota respectively, which is an integer greater than or equal to zero, and the luminous quota of the street lights is set according to a road speed limit or an set distance between two of the street lights, wherein the higher the road speed limit, the greater the luminous quota; and the smaller the set distance between two of the street lights, the greater the luminous quota; wherein if the street lights do not detect a motor vehicle passing by or receive a brightness modulation notice for a period of time, the predetermined brightness value will be used for a lighting setting, and if the detection unit of any one of the street lights has detected a motor vehicle passing by, the dimming unit will read the largest modulated brightness value in the memory unit to perform the lighting setting and the quantity of one of the luminous quota will be used up, and the sending unit will be notified by a Bluetooth™ communication method to transmit the remaining quantity of the luminous quota and the modulated brightness value to the next adjacent street light; wherein if the remaining quantity of the luminous quota is greater than zero, the next street light will notified with the same modulated brightness value; if the luminous quota is used up, the next street light will be notified with the next smaller modulated brightness value and the full quantity of the luminous quota; after the next street light has received the remaining quantity of the luminous quotas and the modulated brightness value through the receiving unit, the dimming unit will be driven to perform the luminous brightness setting according to the modulated brightness value and a quantity of one of the luminous quota will be used up, and the remaining quantity of the luminous quota and the modulated brightness value will be sent immediately to the next street light again, and so on and so forth until all of the N modulated brightness values are set, so as to complete the immediate dynamic modulation of all of the street lights; if the same receiving unit receives two or more of the modulated brightness values simultaneously, the lighting setting will be performed according to the modulated brightness value of a greater brightness. In this way, the energy-saving street light system is capable of quickly adjusting the luminous brightness of each street light dynamically according to the situation of motor vehicles without affecting the drivers' sight, achieving an excellent energy saving effect by reducing the brightness of the street lights in a road section without any motor vehicles, and reducing unnecessary waste of energy.

In an embodiment, the modulated brightness values have an intensity proportion of 100%:70%:50% and the predetermined brightness value is 20%.

In an embodiment, the modulated brightness values have an intensity proportion of 100%:75%:50% and the predetermined brightness value is 25%.

In the embodiment above, each street light is telecommunicatively connected to a console, and each control processor further includes a troubleshooting unit, and if the receiving unit of any one of the street lights receives a luminous brightness test signal transmitted from the console, the dimming unit will be driven to perform a lighting setting according to the luminous brightness test signal and notify the sending unit by a Bluetooth™ communication method to transmit the luminous brightness test signal to the next adjacent street light, and so on and so forth until all of the street lights have received the luminous brightness test signal and performed the lighting setting of the street lights according to the luminous brightness test signal, and after the dimming unit is operated, the troubleshooting unit is driven to detect an actual driving current value of the street light, and if a corresponding driving current value of the luminous brightness test signal is inconsistent with the actual driving current value, detection information will be generated and transmitted to the console.

In summation, the energy-saving street light system with dynamic real-time brightness adjustment of the present disclosure adopts the Bluetooth™ communication technology to send notices to the street lights one by one, dynamically and quickly adjust the luminous brightness of the street lights according to the locations of the motor vehicles, and allow the whole street light system to effectively further reduce the brightness of the street lights in the road section without motor vehicles under the safe condition of providing sufficient lighting to the drivers. More specifically, the present disclosure uses the detection unit of the street light to automatically detect whether or not there is a motor vehicle passing by, and then triggers the action of a short-distance notification for a brightness modulation accordingly. Therefore, the luminous brightness of each street light can be adjusted more accurately, and the technical characteristics of applying the short-distance communication to long-distance street light systems to control in a more efficient and simpler manner are demonstrated.

DESCRIPTION OF THE EMBODIMENTS

This disclosure will now be described in more detail with reference to the accompanying drawings that show various embodiments of this disclosure.

Figure 1:
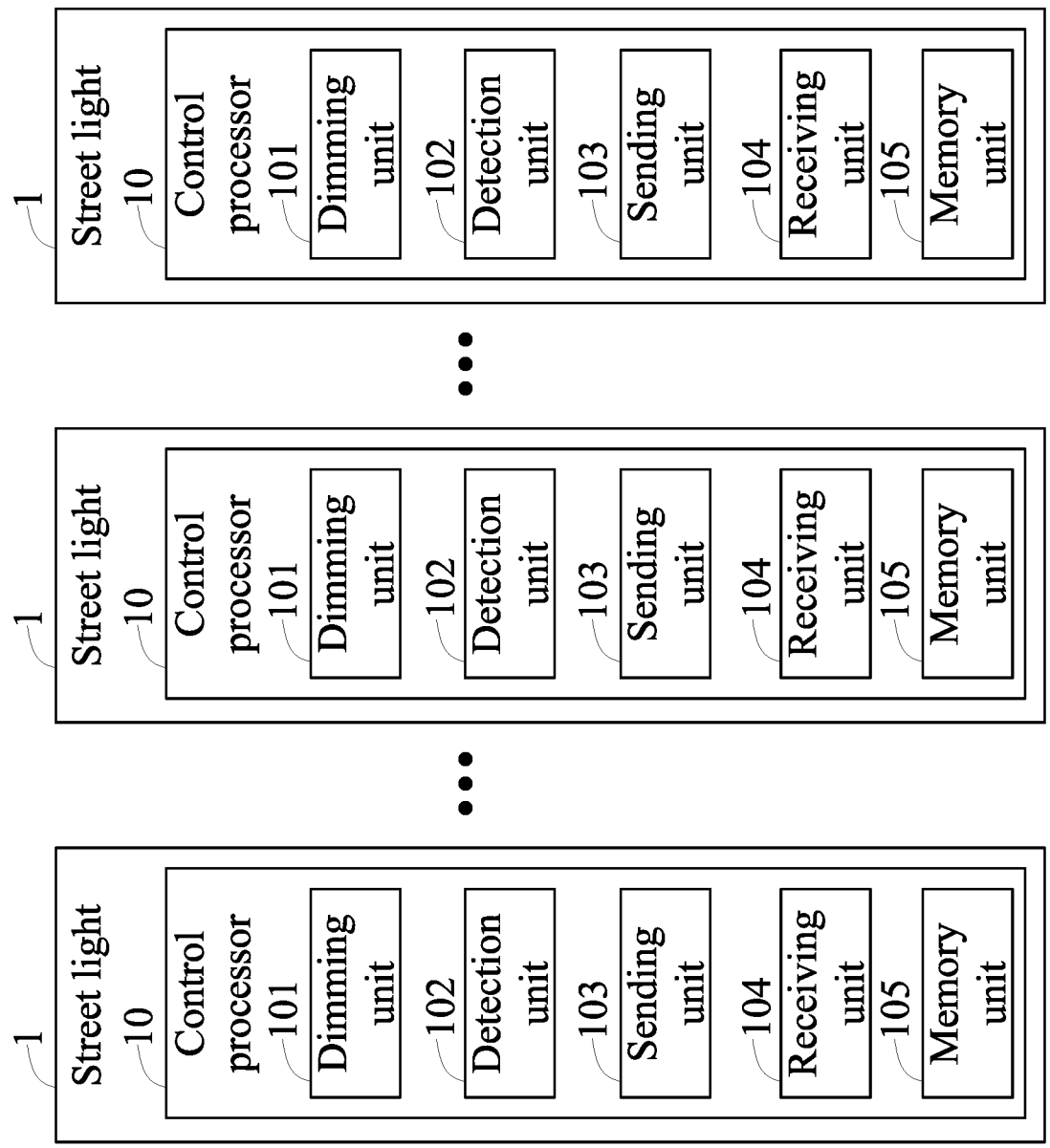
FIG. 1 is a functional block diagram of an energy-saving street light system in accordance with a preferred embodiment of the present disclosure.
Figure 2:
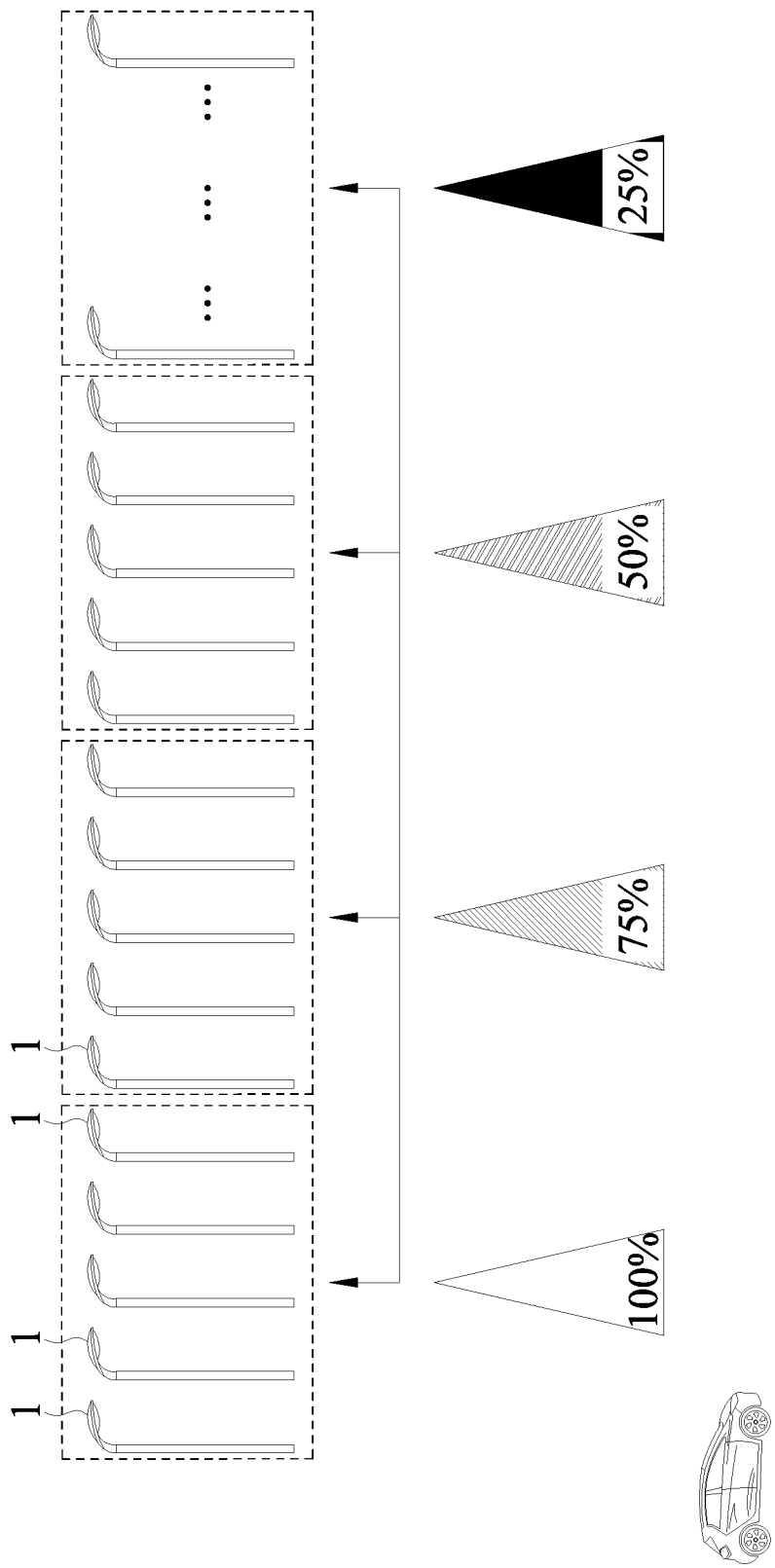
FIG. 2 is a schematic view showing a luminous brightness adjustment of an energy-saving street light system in accordance with a preferred embodiment of the present disclosure.

With reference to FIGS. 1 and 2 for functional block diagram of an energy-saving street light system and the schematic view showing a luminous brightness adjustment of the energy-saving street light system in accordance with a preferred embodiment of the present disclosure respectively, the energy-saving street light system with dynamic real-time brightness adjustment includes a plurality of street lights 1 arranged with an interval apart from one another. Wherein, the street lights 1 are suitable to be installed on various kinds of closed or open roads, such as tunnels, highways, general roads, bridges, etc. The energy-saving street light system is characterized in that each of the street lights 1 has a control processor 10, and the control processor 10 includes a dimming unit 101, a detection unit 102, a sending unit 103, a receiving unit 104 and a memory unit 105, wherein the memory unit 105 stores N modulated brightness values and a predetermined brightness value, and N is an integer greater than zero, and the predetermined brightness value is smaller than the modulated brightness values. Wherein the modulated brightness values of different intensities have a correspondingly same amount of a luminous quota respectively, which is an integer greater than or equal to zero, and the luminous quota of the street lights is set according to a road speed limit or an set distance between two of the street lights, wherein the set distance of the street lights 1 is preferably set to 15~40 m such as 15 m, 20 m, 25 m, 30 m, 35 m and 40 m. The higher the road speed limit, the greater the luminous quota; or the smaller the set distance between two of the street lights, the greater the luminous quota. In practical applications, the luminous quota is set according to road requirements. More specifically, the energy-saving street light system sets the luminous quota according to the installation areas/locations of the street lights 1, the road speed limit or the set distance between two of the street lights 1 and concurrently has the sufficient lighting and effective energy saving effects. The higher the road speed limit or the smaller the set distance, the greater the luminous quota. This ensures that when the street lights 1 change the luminous brightness, the sight of the drivers will not be affected, and road safety can be maintained. For example, if the set distance is 15 m and the road speed limit is 120 Km/h, the luminous quota can be set to 5; if the set distance is 30 m and the road speed limit is also 120 Km/h, the luminous quota can be set to 3. Alternatively, if the set distance is 20 m and the road speed limit is 80 Km/h, the luminous quota can be set to 3; if the set distance is 20 m and the road speed limit is 120 Km/h, the luminous quota can be set to 4. However, the set values of the aforementioned examples are used for illustrating the preferred embodiments only, but the luminous quota can still be set according to road requirements, as long as the setting meets the conditions of "the higher the road speed limit, the greater the luminous quota; or the smaller the set distance between two of the street lights, the greater the luminous quota".

If the street lights 1 do not detect a motor vehicle passing by or receive a brightness modulation notice for a period of time, the predetermined brightness value will be used for lighting setting; if the detection unit 102 of one of the street lights has detected a motor vehicle passing by, the dimming unit 101 will be driven to read the largest modulated brightness value in the memory unit 105 and use it for lighting setting and a quantity of one of the luminous quota will be used up and the sending unit 103 will be notified by a Bluetooth™ communication method to transmit the remaining luminous quota quantity and the modulated brightness value to the next adjacent street light 1. Wherein, if the remaining luminous quota is greater than zero, the same modulated brightness value will be sent to notify the next street light 1; if the luminous quota is used up, the next smaller modulated brightness value and the luminous quota of the full quantity will be notified to the next street light 1. After the next street light 1 has received the remaining quantity of the luminous quotas and the modulated brightness value through the receiving unit 104, the dimming unit 101 will be driven to perform a luminous brightness setting according to the modulated brightness value, and the quantity of one of the luminous quota will be used up, and then the remaining luminous quota and the modulated brightness value will be sent in real time to the next street light 1 again, and so on and so forth until the N modulated brightness values are set, so as to complete the real-time dynamic modulation of all of the street lights 1. If the same receiving unit 104 simultaneously receives two or more of the modulated brightness values, the modulated brightness value with a greater brightness will be used for the lighting setting.

In this way, the energy-saving street light system can use the passing of a motor vehicle as a triggering condition to adjust the luminous brightness of the street lights 1 instantly and dynamically, and to reduce the brightness of the street lights 1 which are farther away from the motor vehicle in order to save energy consumption without affecting the driver's sight. It is noteworthy that although the lighting notice of the energy-saving street light system is literally described as "one-by-one" for the purpose of clarifying the telecommunication more clearly, yet the transmission rate of the information under the Bluetooth™ technology is actually very fast. For human eyes, the street lights 1 can produce a change of brightness instantly according to the aforementioned operation method, and can avoid producing an excessively obvious dark area or affecting the drivers' sight during the process of switching the brightness, as well as eliminating the impact of the change of brightness on the driver's sight. For the luminous quota, since the road speed limit or the set distance between two of the street lights 1 is used as the setting condition, the brightness of the street lights 1 after the dynamic modulation can be configured more appropriately for a lighting area. Such configuration will not cause the drivers to visually produce an obvious dark area in the vicinity, but it can avoid the risk of causing danger on the road.

In an implementation mode, there are three modulated brightness values with an intensity proportion of 100%: 70%:50% and a predetermined brightness value is 20%. Such luminous brightness proportion has the advantages of saving energy and providing sufficient lighting. In another implantation mode, there are also three modulated brightness values with an intensity proportion equal to 100%:75%: 50% and a predetermined brightness value of 25%, which can also provide an excellent lighting and has an energy saving effect.

In an application of a preferred embodiment, there are three modulated brightness values (i.e. N=3), wherein one of the modulated brightness values N1 is equal to 100%, another one of the modulated brightness values N2 is equal to 75%, and another one of the modulated brightness values N3 is equal to 50%, and the predetermined brightness value N0 is equal to 25%, so that their intensity proportion is equal to 100%:75%:50%:25%, and quantity of the luminous quota GP is equal to 5 as shown in the table below.

| | |
|---|---|
| Modulated brightness value N1 | 100% |
| Modulated brightness value N2 | 75% |
| Modulated brightness value N3 | 50% |
| Predetermined brightness value N0 | 25% |

In FIG. 2, under these setting conditions, if the street light 1 that has not detected any motor vehicle passing by or received a brightness modulation notice for a period of time, the predetermined brightness value N0 will be used for the lighting setting and luminous brightness will be adjusted to 25%. If the detection unit 102 of any one of the street lights 1 has detected a motor vehicle passing by (and such street light is the first one from the left of FIG. 2), the dimming unit 101 will be driven to emit light with the modulated brightness value N1 of the largest brightness and give a brightness of 100%, and the quantity of one of the luminous quota GP will be used up. At this time the remaining quantity of the luminous quota GP is decreased by one to become four. The street light 1 that has detected the motor vehicle will notice the sending unit 103 in real time by the Bluetooth™ communication method to transmit the remaining quantity of the luminous quota GP (which is equal to 4) and the modulated brightness value N1 to the next adjacent street light 1 (and such street light is the second one from the left of FIG. 2). Since the remaining quantity of the luminous quota GP is greater than zero, therefore the modulated brightness value N1 transmitted to the next street light 1 is the same (which is 100%). After the next street light 1 receives the remaining quantity of the luminous quota GP 9 (which is equal to 4) and the modulated brightness value N1 (which is 100%) through the receiving unit 104, the dimming unit 101 will be drive to perform a luminous brightness setting according to the modulated brightness value N1, and the quantity of one of the luminous quota GP will be used up, and the remaining quantity of the luminous quota GP and the modulated brightness value N1 will be transmitted in real time to the next street light 1. At this time, the remaining quantity of the luminous quota GP is further decreased by one and equal to 3. The same procedure is carried out so on and so forth until the receiving unit 104 of any one of the street lights 1 (such as the fifth street light from the left of FIG. 2) receives a notice of using up the luminous quota, and such street light 1 will use the next smaller brightness (i.e. the modulated brightness value N of the brightness equal to 75% and the full quantity of the luminous quota GP (i.e. 5) to notice the next street light 1 (which is the sixth street light from the left of FIG. 2). Such procedure will be repeated until the three modulated brightness values N1~N3 are set, so as to complete the real-time dynamic modulation of all of the street lights 1. To cope with the traffic conditions, if the same receiving unit 104 and the detected motor vehicle generate different distances and the receiving unit 104 receives two or more of the modulated brightness values, the modulated brightness value with the greater brightness will be used for the lighting setting (since only one modulated brightness value can be used to set the lighting), so as to ensure the safety of driving.

Figure 3:
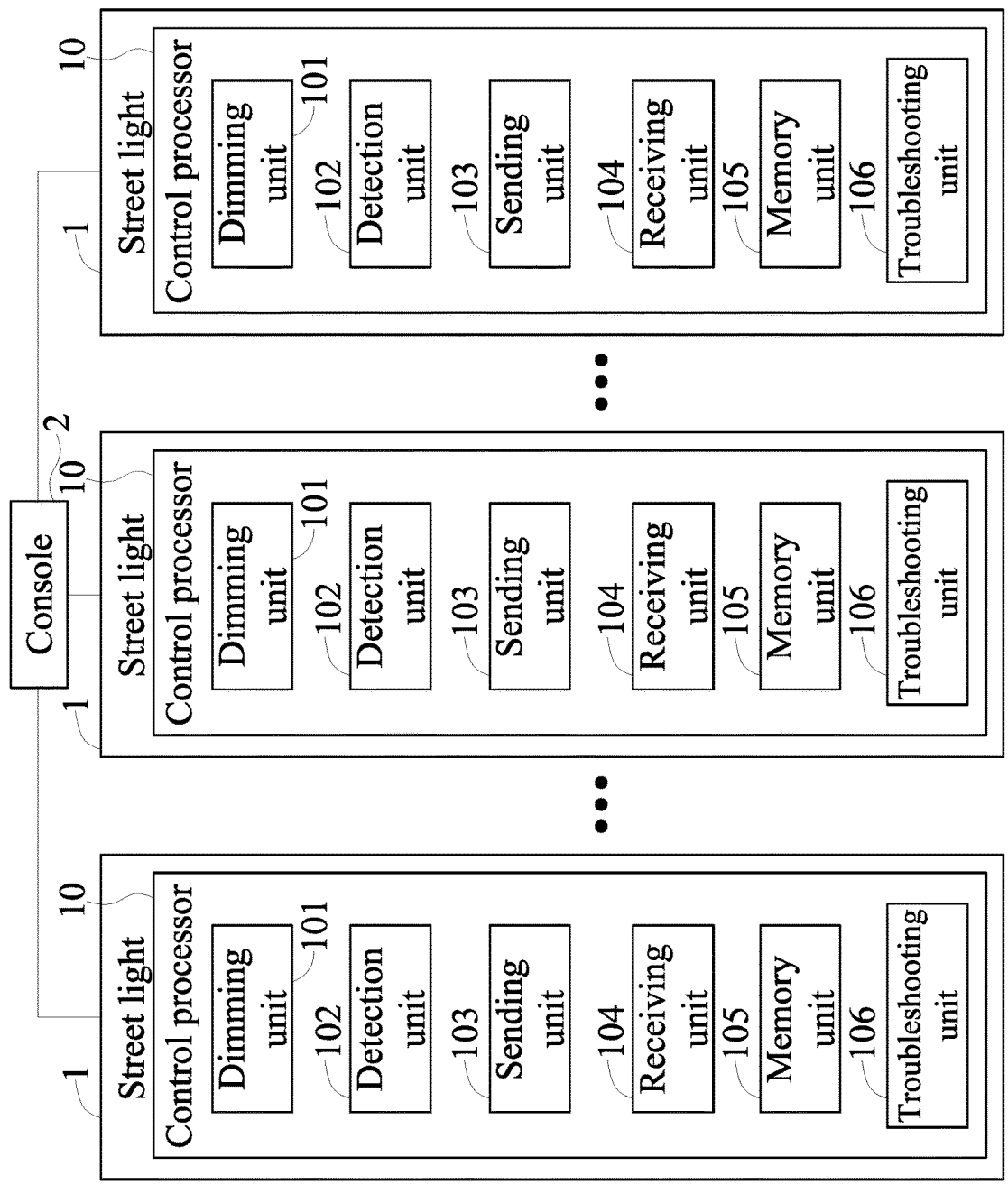
FIG. 3 is a functional block diagram of an energy-saving street light system in accordance with another implementation mode of a preferred embodiment of the present disclosure.

With reference to FIG. 3 for the functional block diagram of an energy-saving street light system in accordance with another implementation mode of a preferred embodiment of the present disclosure, each street light 1 of the energy-saving street light system is telecommunicatively coupled to a console 2, and each control processor 10 further has a troubleshooting unit 106. If the receiving unit 104 of any one of the street lights 1 receives a luminous brightness test signal from the console 2, the dimming unit 101 will be driven to perform the lighting setting according to the luminous brightness test signal and the sending unit 103 will be notified by a Bluetooth™ communication method to transmit the luminous brightness test signal the next adjacent street light 1, and the same procedure is repeated so on and so forth, until all of the street lights 1 have received the luminous brightness test signal and performed the lighting setting according to the luminous brightness test signal. After the dimming unit 101 is operated, the street lights 1 drive the troubleshooting unit 103 to detect an actual driving current value of the street light 1. If a corresponding driving current value of the luminous brightness test signal is inconsistent with the actual driving current value, detection information will be generated and transmitted to the console 2. In the past, the troubleshooting of the street light system generally adopted the method of checking and testing the street lights one by one from time to time to know whether any street light is damaged or broken down, so that the status of the street lights cannot be controlled without carrying out the testing operation. In the present disclosure, the street lights 1 of the energy-saving street light system have the technical characteristic of sending the notification by the one-by-one communication method, so that after the console 2 transmits the luminous brightness test signal to any one of the street lights 1, the street lights 1 can notify one another according to the aforementioned mechanism to carry out the remote inspection quickly and conveniently. After the dimming unit 101 of each street light 1 perform the lighting setting according to the luminous brightness test signal, the troubleshooting unit 106 will test the actual driving current value of the street light 1. If the actual driving current value is inconsistent with the corresponding driving current value, the detection information will be generated and transmitted to the console 2, so that we can immediately know which street light is failed or broken down. For example, after the console 2 transmits the luminous brightness test signal to any one of the street lights 1 in daytime, the street light 1 will immediately start transmitting the luminous brightness test signal and perform the lighting setting according to the aforementioned procedure, wherein the luminous brightness test signal indicates a luminous brightness equal to 30% of a full bright state. When the dimming unit 101 of each street light 1 adjusts the luminous brightness to 30% according to the luminous brightness test signal, the troubleshooting unit 106 will detect the actual driving current value of the street light 1 to determine whether it is the same as the corresponding driving current value with a luminous brightness equal to 30% under the normal status. If they are inconsistent with each other, then the street light 1 will be considered as being failed, and the detection information will be generated and transmitted to the console 2, the street light 1 will be reported to be in a failed status.

In summation of the description above, the energy-saving street light system with dynamic real-time brightness adjustment of the present disclosure pre-sets the street light quota, wherein the street light quota is pre-set for the execution of different luminous brightness according to different road requirements, and then the motor vehicle is detected and used as a triggering condition for the adjustment, and the position of a motor vehicle can be used to dynamically adjust the luminous brightness of each street light in real time. Under the condition of providing sufficient lighting for the drivers safely without affecting their sight, the energy-saving effect of reducing unnecessary energy consumption can be achieved simultaneously, and thus will help reducing the waste of electric energy and making a contribution to alleviating the energy crisis.

In the luminous notification mode of each street light, a Bluetooth™ technology is adopted to modulate the luminous brightness of the street lights by a "one-by-one" communication method and realize the application of the short-distance communication to the long-distance lighting system, while having the advantages of simple and convenient control and low installation cost. It is noteworthy that the aforementioned "one-by-one" communication method refers to the state of information transmission for telecommunications. As to the transmission speed of the Bluetooth™ technology, the change of the brightness of the street lights is actually a momentary action and a safe lighting effect will be maintained without affecting the drivers' sight. In addition, the technology of the energy-saving street light system of the present disclosure can also overcome the difficult issue of maintaining the street lights, and the street lights can have the automatic reporting and troubleshooting effects and control the status of each street light at any time, so as to avoid affecting the traffic safety when a failure of the street light is not discovered immediately.

What is claimed is:

1. An energy-saving street light system with dynamic real-time brightness adjustment, having a plurality of street lights arranged with an interval apart from one another, characterized in that:
    each of the street lights has a control processor, comprising:
    a dimming unit,
    a detection unit,
    a sending unit,
    a receiving unit and
    a memory unit, wherein the memory unit stores N modulated brightness values and a predetermined brightness value, wherein
    N is an integer greater than zero, and the predetermined brightness value is smaller than all of the N modulated brightness values;
    each of the N modulated brightness values corresponds to a luminous quota wherein the luminous quota is an integer greater than or equal to zero, and the luminous quota of the street lights is set according to a road speed limit or an set distance between two of the plurality of street lights, wherein the higher the road speed limit, the greater the luminous quota; and the smaller the set distance between two of the street lights, the greater the luminous quota;
    the control processor is configured to:
    operate the street lights at the predetermined brightness value, when the detection unit does not detect a motor vehicle passing by or when receiving unit does not receive a brightness modulation notice for a period of time;
    when the detection unit detects the motor vehicle passing by, the dimming unit of the street light that detected the motor vehicle, will operate the street light in accordance to the largest modulated brightness value in the memory unit of the street light that detected the motor vehicle and occupy one of the luminous quotas;
    the sending unit of the street light that detected the motor vehicle, will send via a near field communication (Bluetooth™) the remaining quantity of the luminous quotas and the modulated brightness value to a receiving street light; wherein
    when the remaining quantity of the luminous quota of the largest modulated brightness value is greater than zero, the receiving street light will operate the street light in accordance with the received modulated brightness value;
    when the remaining quantity of the luminous quota of the modulated brightness value is equal to zero, the receiving street light will operate the street light in accordance with the next largest modulated brightness value and occupy one of the luminous quotas;
    the process repeats until all of the luminous quotas of all of the N modulated brightness value is equal to zero, so as to complete an immediate dynamic modulation of all of the street lights;
    when any of the receiving unit receives two or more of the modulated brightness values simultaneously, the street light will operate in accordance with the modulated brightness value of a greater value.

2. The energy-saving street light system according to claim 1, wherein each of the street lights is telecommunicatively coupled to a console, and each of the control processors further comprises a troubleshooting unit, and when the receiving unit of any one of the street lights receives a luminous brightness test signal transmitted from the console, the dimming unit will be driven to perform a lighting setting according to the luminous brightness test signal and notify the sending unit by a near field communication (Bluetooth™) method to transmit the luminous brightness test signal to the next adjacent street light, and so on and so forth until all of the street lights have received the luminous brightness test signal and performed the lighting setting of the street lights according to the luminous brightness test signal, and after the dimming unit is operated, the troubleshooting unit is driven to detect an actual driving current value of the street light, and when a corresponding driving current value of the luminous brightness test signal is inconsistent with the actual driving current value, detection information will be generated and transmitted to the console.

3. The energy-saving street light system of claim 1, wherein the modulated brightness values have an intensity proportion of 100%:70%:50% and the predetermined brightness value is 20%.

4. The energy-saving street light system according to claim 3, wherein each of the street lights is telecommunicatively coupled to a console, and each of the control processors further comprises a troubleshooting unit, and when the receiving unit of any one of the street lights receives a luminous brightness test signal transmitted from the console, the dimming unit will be driven to perform a lighting setting according to the luminous brightness test signal and notify the sending unit by a near field communication (Bluetooth™) method to transmit the luminous brightness test signal to the next adjacent street light, and so on and so forth until all of the street lights have received the luminous brightness test signal and performed the lighting setting of the street lights according to the luminous brightness test signal, and after the dimming unit is operated, the troubleshooting unit is driven to detect an actual driving current value of the street light, and when a corresponding driving current value of the luminous brightness test signal is inconsistent with the actual driving current value, detection information will be generated and transmitted to the console.

5. The energy-saving street light system of claim 1, wherein the modulated brightness values have an intensity proportion of 100%:75%:50% and the predetermined brightness value is 25%.

6. The energy-saving street light system according to claim 5, wherein each of the street lights is telecommunicatively coupled to a console, and each of the control processors further comprises a troubleshooting unit, and when the receiving unit of any one of the street lights receives a luminous brightness test signal transmitted from the console, the dimming unit will be driven to perform a lighting setting according to the luminous brightness test signal and notify the sending unit by a near field communication (Bluetooth™) method to transmit the luminous brightness test signal to the next adjacent street light, and so on and so forth until all of the street lights have received the luminous brightness test signal and performed the lighting setting of the street lights according to the luminous brightness test signal, and after the dimming unit is operated, the troubleshooting unit is driven to detect an actual driving current value of the street light, and when a corresponding driving current value of the luminous brightness test signal is inconsistent with the actual driving current value, detection information will be generated and transmitted to the console.

* * * * *